US010625892B2

(12) United States Patent
Bonneville et al.

(10) Patent No.: US 10,625,892 B2
(45) Date of Patent: Apr. 21, 2020

(54) WEB PACKAGING MACHINES WITH VARIABLE DEPTH FORMING

(71) Applicant: Alkar-RapidPak, Inc., Lodi, WI (US)

(72) Inventors: Craig R. Bonneville, Black Earth, WI (US); Matthew John Doll, Waunakee, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 561 days.

(21) Appl. No.: 15/289,604

(22) Filed: Oct. 10, 2016

(65) Prior Publication Data

US 2017/0107006 A1 Apr. 20, 2017

Related U.S. Application Data

(60) Provisional application No. 62/241,359, filed on Oct. 14, 2015.

(51) Int. Cl.
| *B65B 47/10* | (2006.01) |
| *B65B 59/00* | (2006.01) |
| *B65B 65/02* | (2006.01) |
| *B29C 43/32* | (2006.01) |
| *B65B 47/04* | (2006.01) |

(Continued)

(52) U.S. Cl.
CPC ............ *B65B 47/04* (2013.01); *B29C 43/22* (2013.01); *B29C 43/44* (2013.01); *B65B 9/04* (2013.01); *B65B 47/10* (2013.01); *B65B 59/00* (2013.01); *B65B 59/04* (2013.01); *B65B 65/02* (2013.01); *B29C 2043/3283* (2013.01); *B29L 2031/712* (2013.01)

(58) Field of Classification Search
CPC .................. B65B 47/04; B29C 43/22

USPC ......................................................... 264/167
See application file for complete search history.

(56) References Cited

U.S. PATENT DOCUMENTS 196,117 A * 10/1877 Greenleaf ................ B66F 3/16
254/103
3,218,776 A 11/1965 Cloud
(Continued)

FOREIGN PATENT DOCUMENTS

| DE | 1120119 | 12/1961 |
| EP | 2769923 | 8/2014 |

(Continued)

OTHER PUBLICATIONS

Partial European Search Report, EP Patent Application No. 16020400.4, date of completion Feb. 9, 2017.

(Continued)

*Primary Examiner* — Robert C Dye
*Assistant Examiner* — Russell E Sparks
(74) *Attorney, Agent, or Firm* — Andrus Intellectual Property Law, LLP

(57) ABSTRACT

A packaging machine is for forming a product cavity in a web including a forming die box defining a recess into which the product cavity is formed. An insert is axially movable in the recess to thereby vary a depth of the recess. A variable depth mechanism selectively moves the insert to vary the depth of the recess. The packaging machine includes a latching mechanism that moves the forming die box into and between a first position in which the forming die box is spaced apart from the die box base and a second position in which the forming die box is supported by the die box base.

15 Claims, 8 Drawing Sheets

(51) Int. Cl.
*B65B 9/04* (2006.01)
*B65B 59/04* (2006.01)
*B29C 43/22* (2006.01)
*B29C 43/44* (2006.01)
*B29L 31/00* (2006.01)

(56) References Cited

U.S. PATENT DOCUMENTS

| | | | | |
|---|---|---|---|---|
| 3,546,746 A | * | 12/1970 | Johnson | B21C 23/00 |
| | | | | 425/148 |
| 3,869,052 A | * | 3/1975 | Leahy | A21B 3/07 |
| | | | | 414/401 |
| 5,323,590 A | | 6/1994 | Garwood | |
| 6,659,417 B2 | * | 12/2003 | Hsieh | F16M 11/18 |
| | | | | 248/404 |
| 7,168,549 B1 | * | 1/2007 | Harrison | B62D 65/06 |
| | | | | 198/346.2 |
| 7,490,448 B1 | | 2/2009 | Bonneville et al. | |
| 7,607,279 B2 | | 10/2009 | Shackelford et al. | |
| 8,181,432 B2 | | 5/2012 | Bonneville et al. | |
| 8,539,743 B2 | * | 9/2013 | Rapparini | B65B 9/042 |
| | | | | 53/122 |
| 9,828,129 B2 | * | 11/2017 | Geble | B29C 65/7841 |
| 10,207,451 B2 | * | 2/2019 | Baur | B65B 47/10 |
| 2016/0046063 A1 | * | 2/2016 | Baur | B65B 47/10 |
| | | | | 264/318 |

FOREIGN PATENT DOCUMENTS

| | | |
|---|---|---|
| EP | 2985234 | 11/2016 |
| WO | 2011104036 | 9/2011 |

OTHER PUBLICATIONS

Extended European Search Report and Written Opinion, EP Patent Application No. 16020400.4, date of completion Feb. 9, 2017.
European Opposition Issued in EP Application No. 16020400.4 dated Feb. 13, 2020.
European Opposition Issued in EP Application No. 16020400.4 dated Feb. 19, 2020.

* cited by examiner

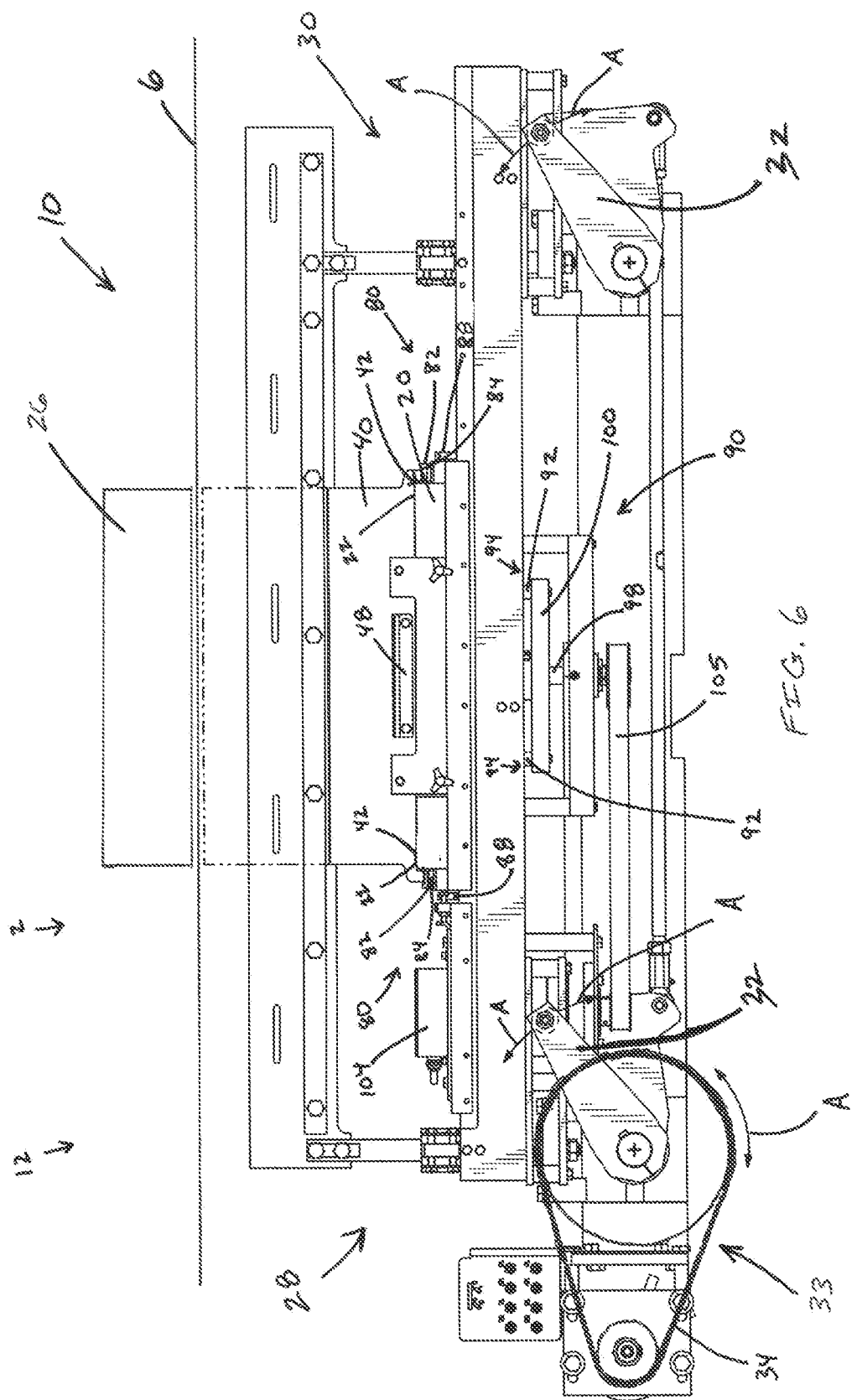

WEB PACKAGING MACHINES WITH VARIABLE DEPTH FORMING

CROSS-REFERENCE TO RELATED APPLICATION

The present application is based on and claims priority to U.S. Provisional Patent Application Ser. No. 62/241,359 filed Oct. 14, 2015, the disclosure of which is incorporated herein by reference.

FIELD

The present disclosure relates to web packaging machines for packaging a product between upper and lower webs.

BACKGROUND

The following patents are incorporated herein by reference in entirety:

U.S. Pat. No. 7,490,448 discloses a form-fill-seal web packaging system that includes a pressure monitor at the sealing station to monitor a sealing pressure. A bladderless actuator effects relative movement of dies and applies the sealing pressure.

U.S. Pat. No. 7,607,279 discloses a web packaging system that provides easy access and changing of tooling. The changing of tooling thereby changes a product receiving cavity pocket in a lower web.

U.S. Pat. No. 8,181,432 discloses a web packaging system that provides easy access and changing of a forming plug tooling.

SUMMARY

This Summary is provided herein to introduce a selection of concepts that are further described herein below in the Detailed Description. This Summary is not intended to identify key or essential features from the claimed subject matter, nor is it intended to be used as an aid in limiting the scope of the claimed subject matter.

In certain examples, a packaging machine for forming a product cavity in a web includes a forming die box that defines a recess into which the product cavity is formed, an insert that is movable in the recess to thereby vary a depth of the recess, and a variable depth mechanism that selectively moves the insert to vary the depth of the recess.

In certain examples, a packaging machine for forming a product cavity in a web includes a forming die box that defines a recess into which the product cavity is formed, a die box base that supports the forming die box, and a latching mechanism that selectively moves the forming die box into and between a first position in which the forming die box is spaced apart from the die box base and a second position in which the forming die box is supported by the die box base.

In certain examples, a method for forming a product cavity in a web includes providing a forming die box that defines a recess into which the product cavity is formed, positioning an insert in the forming die box such that the insert is axially movable in the recess to thereby vary a depth of the recess, actuating a variable depth mechanism to selectively move the insert to vary the depth of the recess, and then forming the product cavity in the web.

BRIEF DESCRIPTION OF THE DRAWINGS

Examples are described with reference to the following drawing figures. The same numbers are used throughout the drawing figures to reference like features and components.

FIG. 8 is an enlarged cross sectional view of the forming die box depicted in FIG. 2 through a recess of the forming die box.

DETAILED DESCRIPTION OF THE DRAWING

In the present disclosure, certain terms have been used for brevity, clearness, and understanding. No unnecessary limitations are to be implied therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

Packaging machines for packaging food products between two webs of elastic materials are known in the food packaging industry. Often, the packaging machines form a product cavity in at least one of the webs to hold the food product. The product cavity is formed by a forming die box that defines a recess into which the product cavity is formed. The forming die box often must be changed to form and/or accommodate size/dimension requirements for different product cavity sizes. For example, a forming die box having recesses with a 2.0 inch recess depth may be changed with a forming die box having recesses with a 4.0 inch recess depth. The process of changing the forming die box usually requires that the packaging machine be shut down in order for the forming die box to be removed and/or the web to be cut and peeled away. In other examples, the recess depth can be changed by manually inserting or removing plates or blocks into the recess (e.g. a 1.0 inch plate is inserted into the recess of the forming die box to decrease the depth of the product cavity 1.0 inch).

Changing the forming die box and/or the recess depth disadvantageously requires operator interaction and shutdowns of the packaging machine which lead to lost packaging time and inefficiencies. The inventor has recognized these problems and has endeavored to provide apparatuses for changing the depth of product cavities formed in a web by a packaging machine. The present disclosure provides apparatuses and methods for allowing simplified, user-friendly, and automated recess depth change for forming die boxes.

Figure 1:
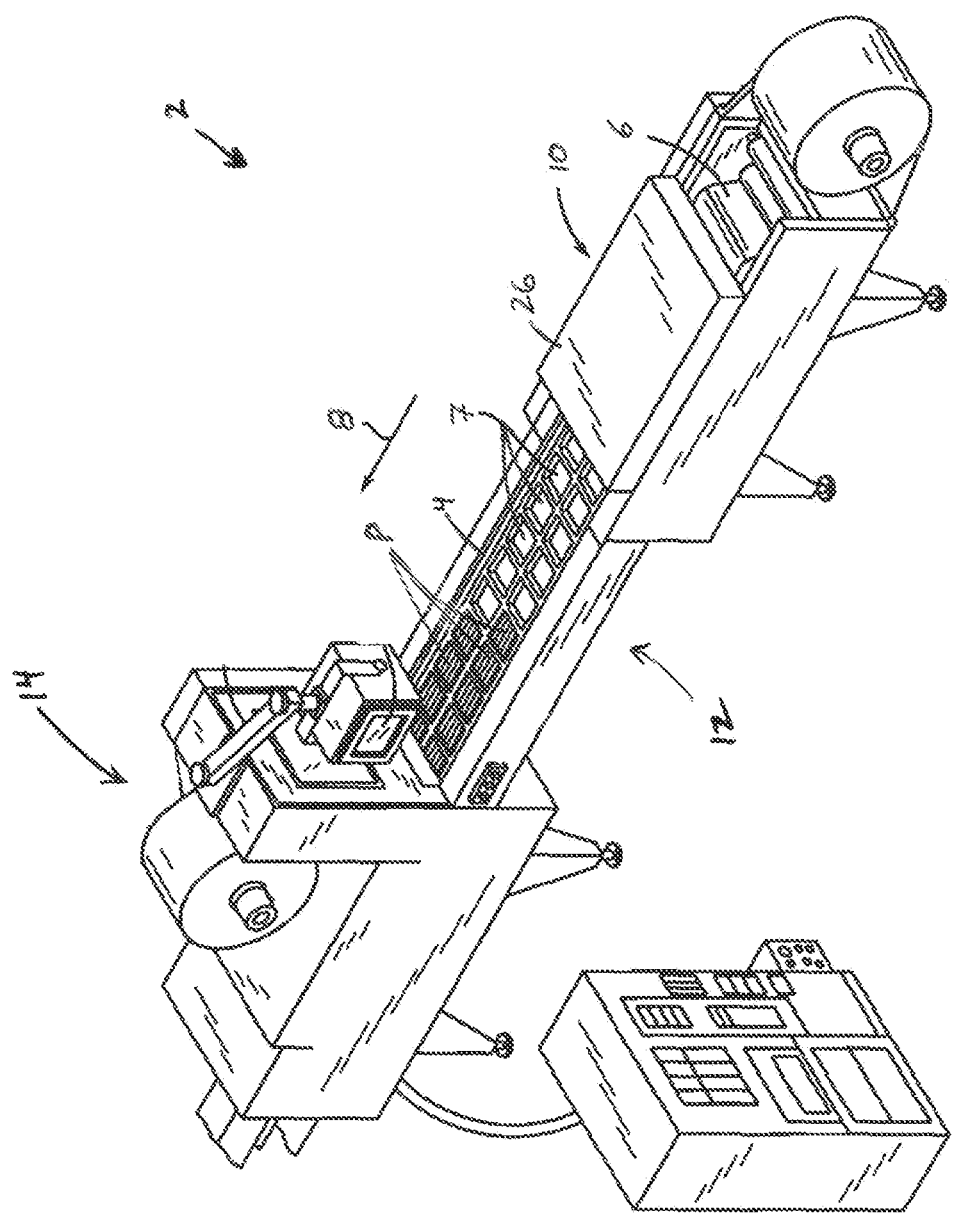
FIG. 1 is an example web packaging machine.

FIG. 1 depicts an indexing motion packaging machine 2 that includes a web transport conveyor 4 transporting a web 6 of flexible packaging material from upstream to downstream through a series of stations including a forming station 10 that forms at least one product cavity 7 in the web 6, a loading station 12 that places food product P in the product cavity 7, and a closing station 14 that closes and/or seals the pocket with another web of flexible packaging material.

Figure 2:
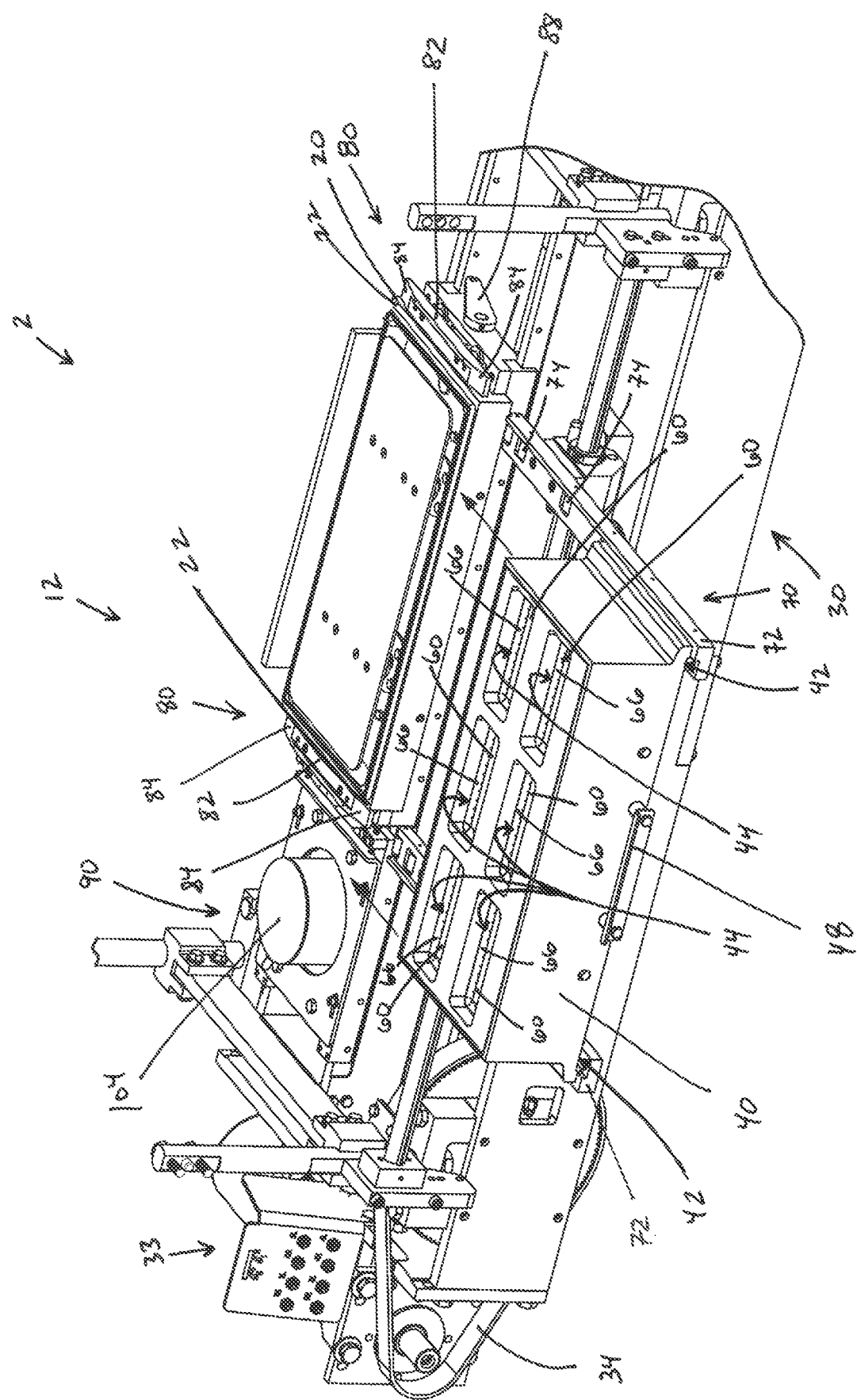
FIG. 2 is a perspective view of an example forming station of the web packaging machine having a forming die box in a staging position and a guide track assembly in an extended position.
Figure 3:
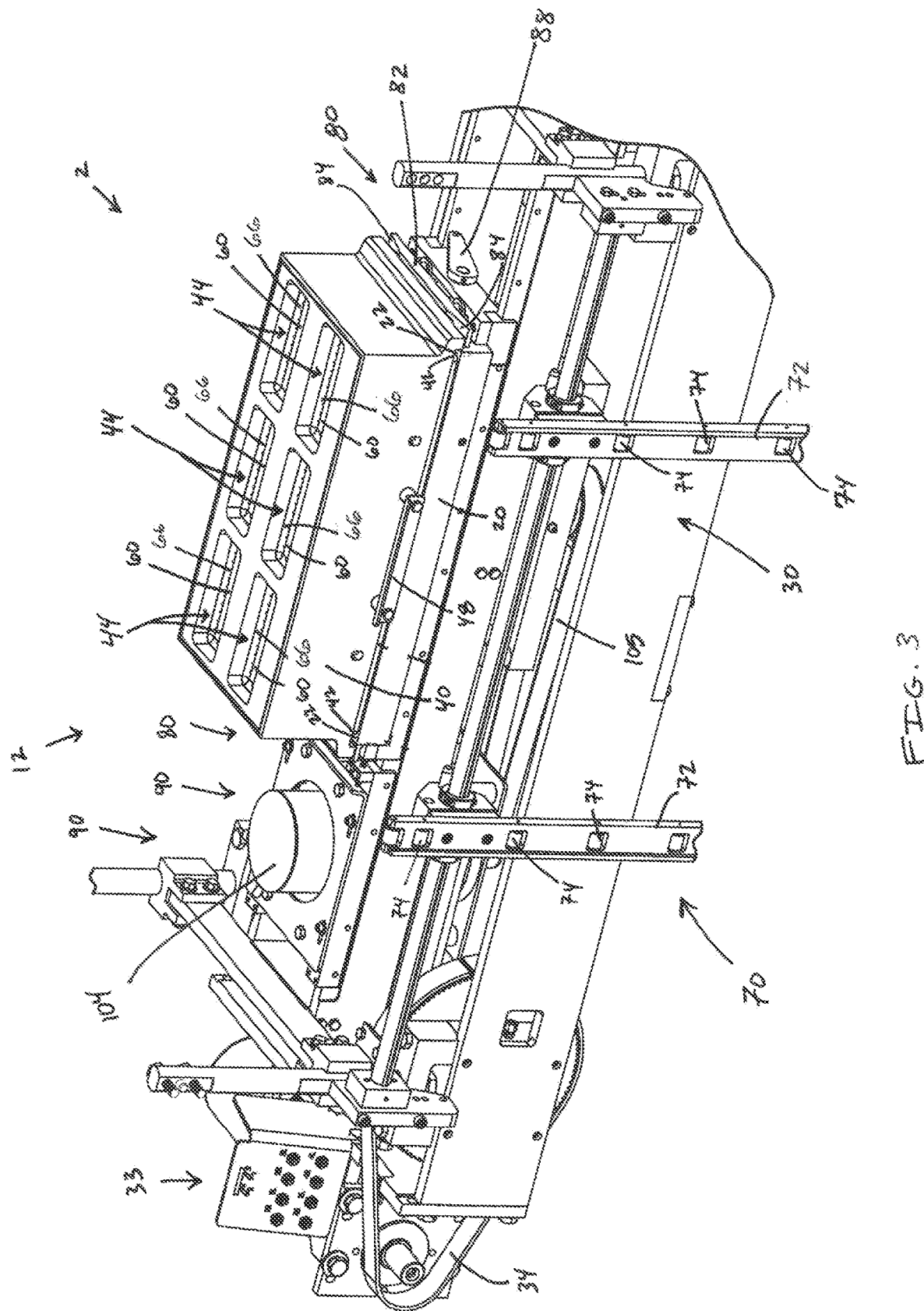
FIG. 3 is a perspective view of the forming station of FIG. 2 having the forming die box in a first position and the guide track assembly in a retracted position.

Referring to FIGS. 2-3, the forming station 10 includes a die box base 20 that is fixedly coupled to a frame assembly 30 (further described herein below) of the packaging machine 2. The die box base 20 includes a perimeteral surface 22 that corresponds to and abuts a perimeteral surface 42 on a forming die box 40 (further described herein below). The die box base 20 also defines at least one hole 24 (see FIG. 8) through which an engagement member 92 (further described herein below) extends.

The forming station 10 includes the forming die box 40 which is configured to define at least one recess 44 in the web 6, into which the product cavity 7 is formed. A bottom surface of the recess 44 and/or the depth of the recess 44 is defined by an insert 60 (further described herein below) which is received in the recess 44. The forming die box 40 includes a shelf 46 (see FIG. 8) that radially projects into the recess 44 to axially support the insert 60 in the forming die box 40 (i.e. the shelf 46 prevents the insert 60 from falling through the recess 44 and out of the forming die box 40). The forming die box 40 also defines the perimeteral surface 42 that corresponds to and abuts the perimeteral surface 22 of the die box base 20. The number of recesses 44, the shape of the recess 44, the depths of the recesses 44, the recess depths, and/or other dimensions of the recess 44 can vary. In the example depicted in FIG. 2, six rectangular recesses 44 are depicted. A handle 48 is coupled to the forming die box 40 to assist the user in moving the forming die box 40. Reference is made to the incorporated U.S. Pat. No. 7,607,279 for further explanation of movable die boxes.

The forming die box 40 is moveable into and out of the forming station 10 by a guide track assembly 70 that is configured to support the forming die box 40. The guide track assembly 70 allows the forming die box 40 to be moved between a staging position (see FIG. 2) such that the forming die box 40 can be easily removed (e.g. lifted) from the forming station 10 by an operator and a first position (see FIGS. 3-4) in which the forming die box 40 is axially above the die box base 20. The guide track assembly 70 includes a pair of rails 72 having rollers 74 that reduce friction between the forming die box 40 and the guide track assembly 70 as the forming die box 40 is moved on the guide track assembly 70. The guide track assembly 70 is movable between a retracted position (see FIG. 3) in which the rails 72 are substantially vertical and adjacent to the frame assembly 30 and an extended position (see FIG. 2) such that the rail members 82 are substantially horizontal and support the forming die box 40 in a staging position (see FIG. 2) which is offset from the packaging machine 2. When loading the forming die box 40 into the forming station 10, an operator moves the guide track assembly 70 to the extended position (see FIG. 2) and places the forming die box 40 onto the rails 72. The operator then pushes the forming die box 40 along the rails 72 into the first position (see FIG. 3). Once the forming die box 40 is in the first position, the operator rotates the guide track assembly 70 back to the retracted position (see FIGS. 3-4). When unloading the forming die box 40 from the forming station 10, the operator moves the guide track assembly 70 to the extended position and then pulls the forming die box 40 into the staging position (see FIG. 2). The operator can then remove the guide track assembly 70. Reference is made to the incorporated U.S. Pat. No. 7,607,279 for further details of the guide track assembly 70. In certain examples, a locking plate 38 (see FIG. 5) secures the forming die box 40 to the die box base 20.

Figure 4:
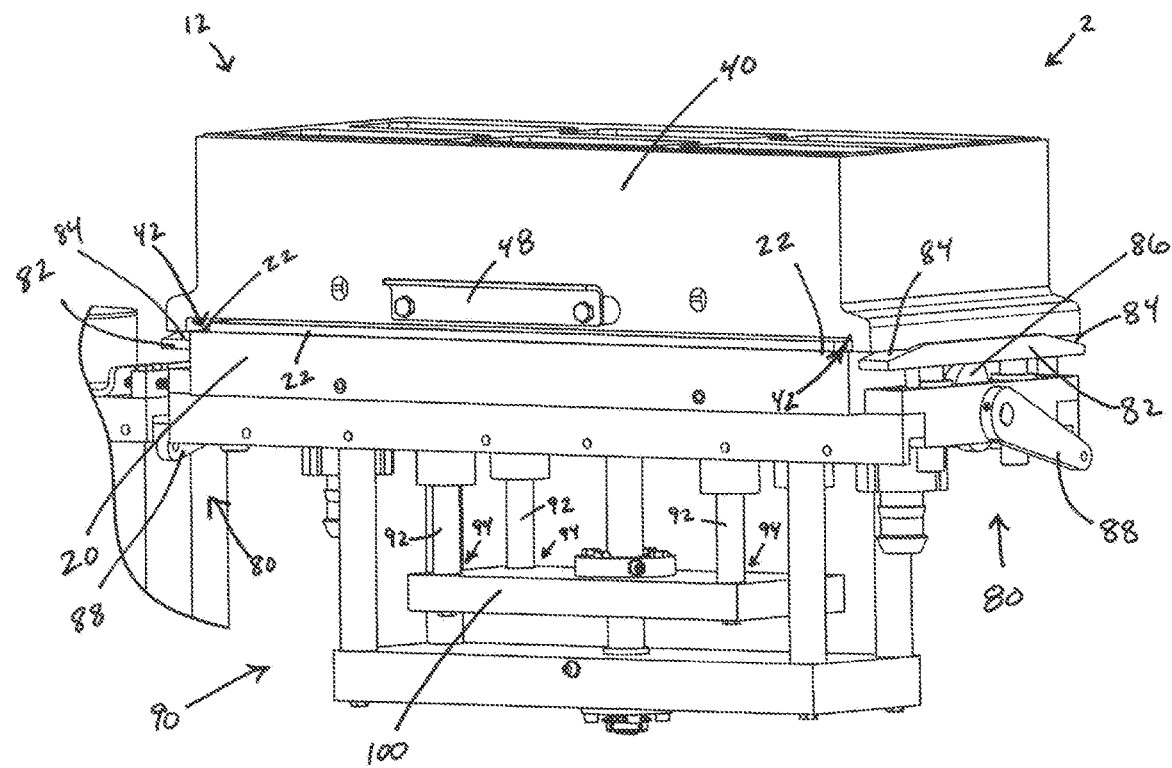
FIG. 4 is an enlarged view of the forming station of FIG. 2, the forming die box in the first position.
Figure 5:
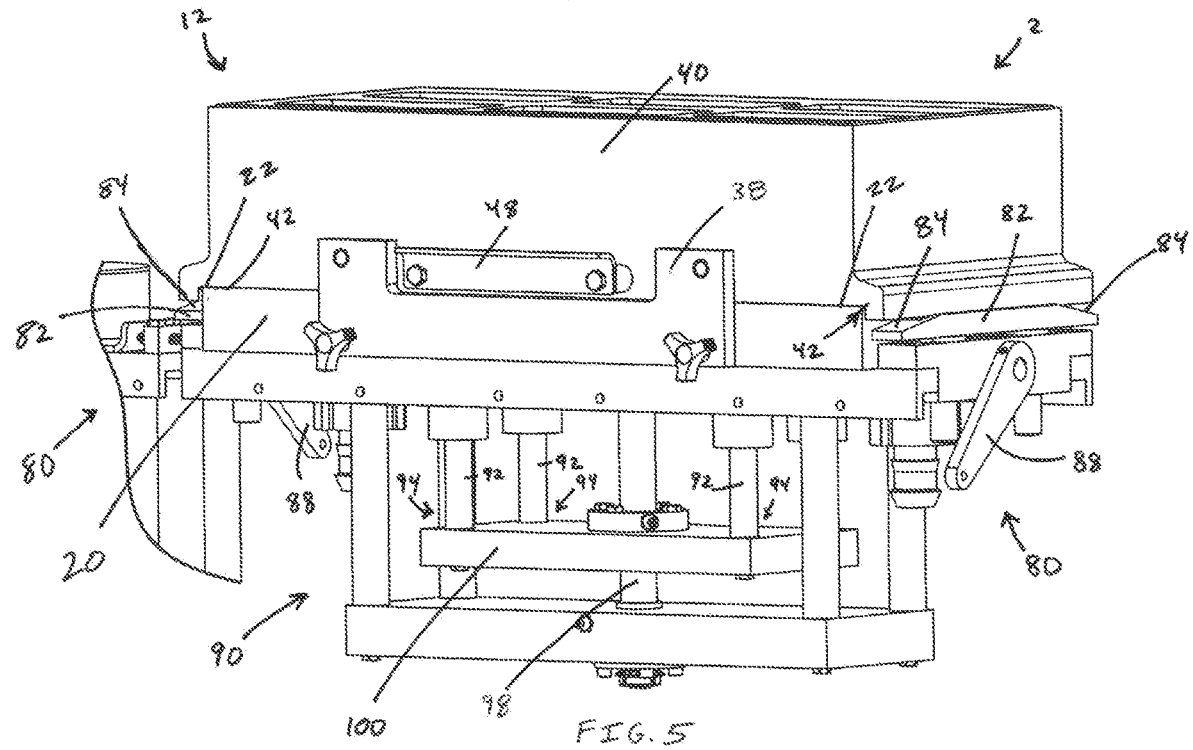
FIG. 5 is an enlarged view of the forming station of FIG. 2, the forming die box in a second position.

Referring to FIGS. 4-5, the forming die box 40 is axially movable within the forming station 10 by a latching mechanism 80 that secures the forming die box 40 to the forming station 10 by moving the forming die box 40 into and out of engagement with the die box base 20. The latching mechanism 80 moves the forming die box 40 into and between the first position (see FIGS. 3-4) in which the forming die box 40 is spaced apart from the die box base 20 and a second position (see FIG. 5) wherein the forming die box 40 is supported by the die box base 20 (or otherwise mates with or engages with the die box base 20). That is, the latching mechanism 80 axially moves the forming die box 40 such that the perimeteral surface 22 of die box base 20 is supported by the perimeteral surface 42 of the forming die box 40. When the forming die box 40 is in the first position (see FIGS. 3-4), the forming die box 40 is freely laterally movable away from the die box base 20, and when the forming die box 40 is in the second position (see FIG. 5) the forming die box 40 is supported by the die box base 20. The forming die box 40 is supported by the die box base 20 in a manner that creates a fluid tight seal and define an interior vacuum space 28 (see FIG. 8) there between, and the fluid tight seal is created when the perimeteral surface 22 of the die box base 20 abuts the perimeteral surface 42 of the forming die box 40. The forming die box 40 and the die box base 20 cooperate with a cover 26 (see FIG. 6) (described further herein below) positioned above the web 6 at the forming station 10 to create a vacuum in the interior vacuum space 28 and thereby form the product cavity 7 under force of vacuum. In certain examples, a gasket 47 (see FIG. 8) is included along the perimeteral surface 22 of the die box base 20 to create a vacuum tight seal between the forming die box 40 and the die box base 20.

The latching mechanism 80 includes a rail member 82 for axially supporting the forming die box 40 in the first position (see FIGS. 3-4). The rail member 82 includes a sloped surface 84 configured allow the forming die box 40 to slide along the rail member 82 when the forming die box 40 moves between the staging position (see FIG. 2) and the first position (see FIGS. 3-4). The latching mechanism 80 includes an eccentric member 86 that is configured to rotate to thereby move the rail member 82 such that the forming die box 40 moves between the first position (see FIGS. 3-4) and the second position (see FIG. 5). That is, rotation of the eccentric member 86 moves the rail member 82 thereby moving the forming die box 40 into and between the first position (see FIGS. 3-4) and the second position (see FIG. 5). For example, the eccentric member 86 is rotatable in a first direction such that the rail member 82 axially moves downward and the forming die box 40 moves from the first position (see FIGS. 3-4) to the second position (see FIG. 5); and the eccentric member 86 is rotatable in a second direction opposite the first direction such the rail member 82 axially moves upward and the forming die box 40 moves to the from the second position (see FIG. 5) to the first position (see FIGS. 3-4). The shape of the eccentric member 86 can vary. In one example, the eccentric member 86 is a semicircle disk. The latching mechanism 80 includes a handle 88 by which an operator can manually rotate the eccentric member 86.

Figure 6:
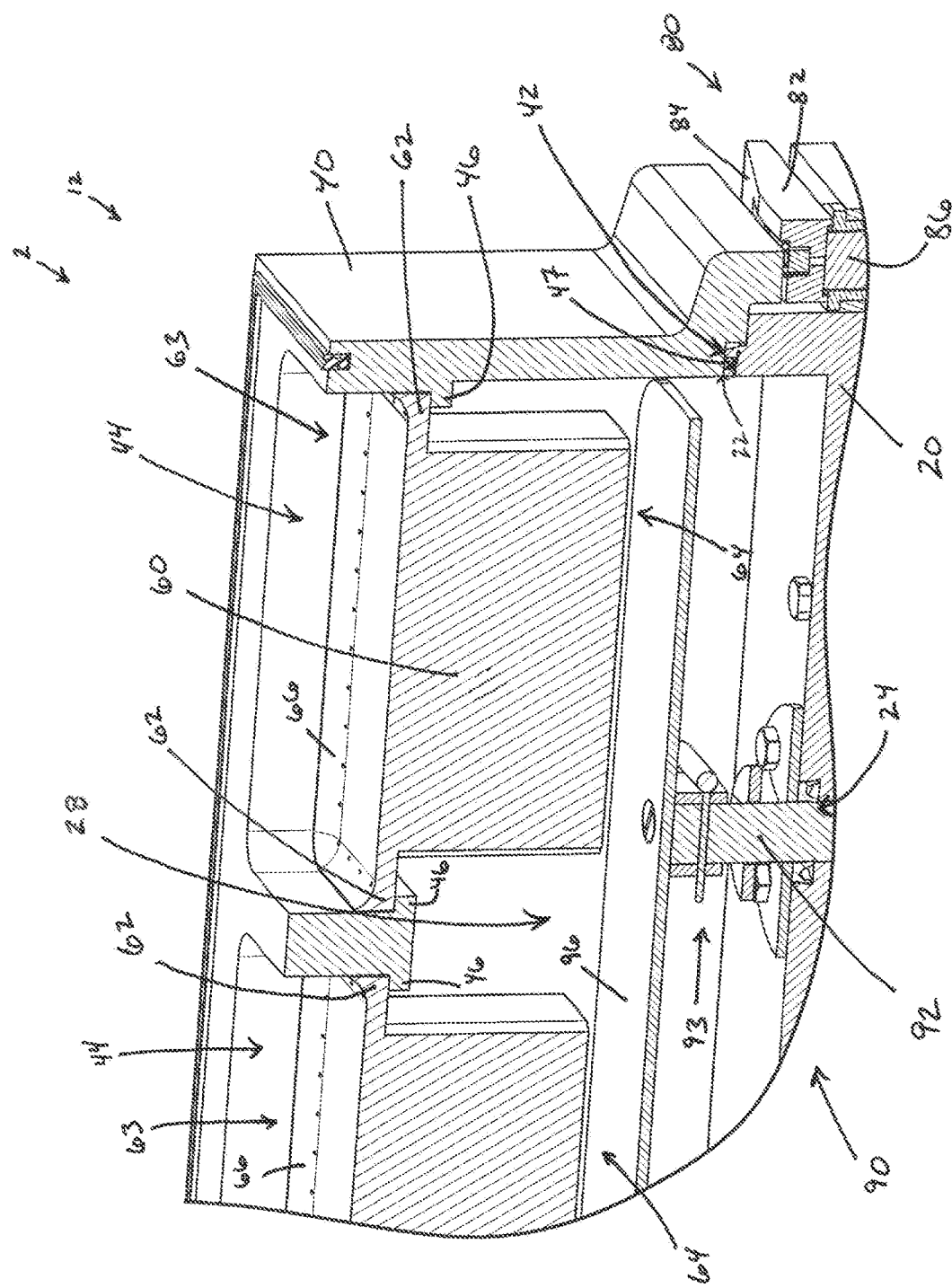
FIG. 6 is a side view of the forming station of FIG. 2 including a framing assembly movable between a first lowered position and a second forming position, the forming die box and a die box base move axially (as depicted in dashed lines) when the framing assembly moves to the second forming position.

Once the forming die box 40 is positioned in the second position (see FIG. 5), the packaging machine 2 can form the product cavity 7 in the web 6. Referring to FIG. 6, the forming die box 40 (which is in the second position) and the die box base 20 are supported by a movable base plate or frame assembly 30 which moves during operation of the packaging machine 2. The frame assembly 30 is movable between a lowered position axially below the web 6 such that the forming die box 40 is axially below the web 6 and the web 6 is allowed to advance; and a forming position such that the forming die box 40 engages the web 6 to thereby form the product cavity 7 in the web 6 (the forming die box 40 is depicted in dash-doubledot-dash line weight in FIG. 6 when the frame assembly 30 is in the forming position). When the frame assembly 30 is in the forming position, the cover 26 (which is stationary and fixedly mounted to the packaging machine 2 at the forming station 10) cooperates with forming die box 40 to create a vacuum in the interior vacuum space 28 and thereby form the product cavity 7 in the web 6. Vacuum equipment (not shown and known in the prior art) coupled to the die box base 20 creates the vacuum in the interior vacuum space 28 such that the product cavity 7 is formed in the web 6. The cover 26 optionally includes a plug assist mechanism having a plug member, a heat plate, and/or the like. The frame assembly 30 is moved between the lowered position and the forming position by lift arms 32 that are rotated by an actuator 35 (e.g. a servo motor) and belt 34 (see movement arrows A which depict movement of the lift arms 32 and the belt 34).

Figure 7:
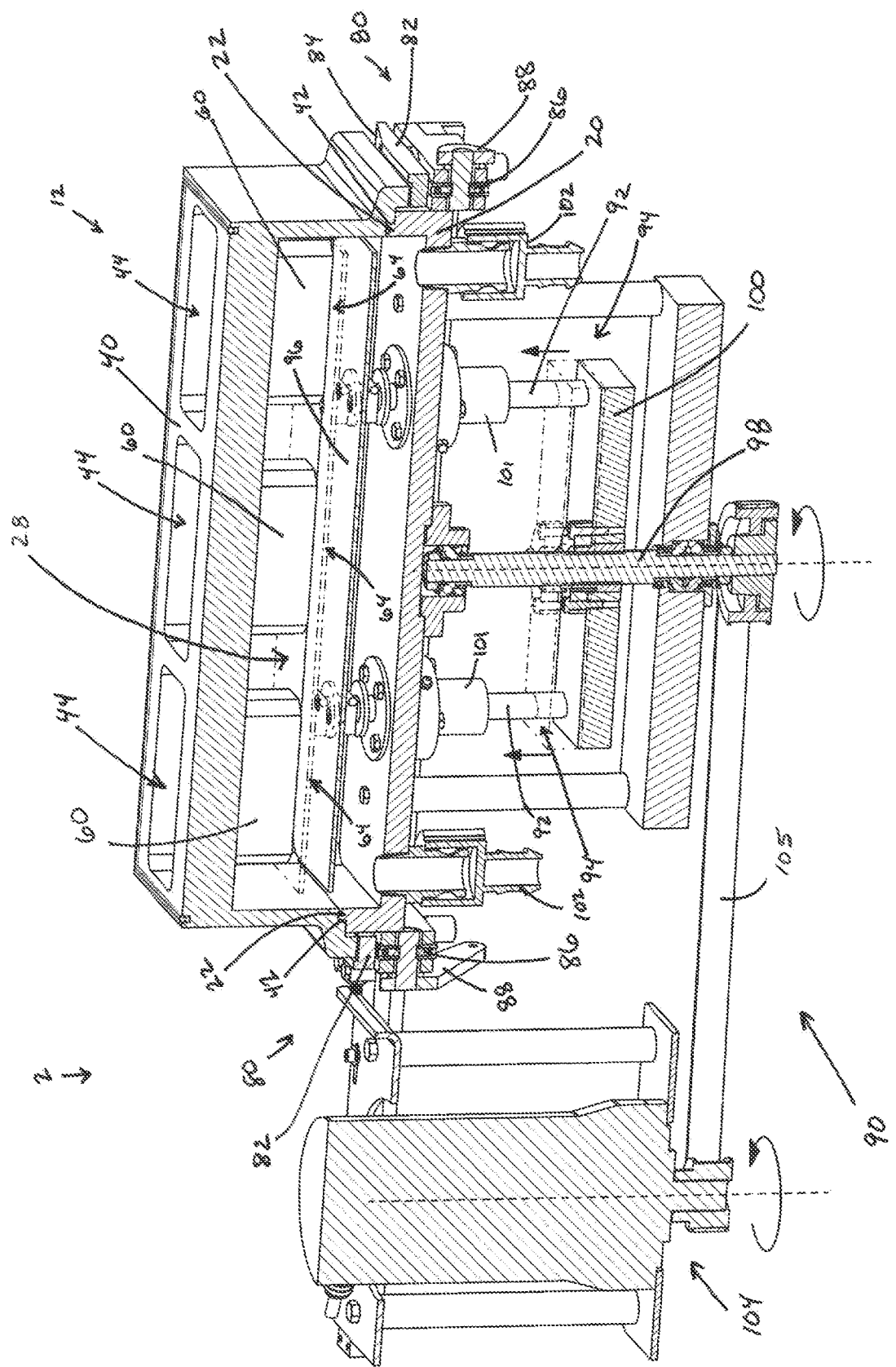
FIG. 7 is a cross sectional view of the forming station depicted in FIG. 2 through a middle of the forming die box, the forming die box is in the second position and a variable depth mechanism extending into an interior vacuum space.

Referring to FIGS. 7-8, the inserts 60 received in the forming die box 40 are shown in greater detail. As described above, the bottom surface of the recess 44 is defined by the insert 60 which is received or positioned in the recess 44 such that the insert 60 is axially movable in the recess 44 to thereby vary the depth of the recess 44 or the recess depth. The insert 60 includes a projection 62 that radially extends from the insert 60 to contact the shelf 46 of the forming die box 40 (see FIG. 8) such that the insert 60 is supported in the recess 44 (i.e. the projection 62 of the insert 60 contacts the shelf 46 to prevent the insert 60 from axially moving through the forming die box 40 in one axial direction). The insert 60 includes an upper end 63 and a lower end 64 opposite the lower end 64, and the projection 62 is located nearer the upper end 63 than the lower end 64 such that the lower end 64 is axially below the shelf 46 of the forming die box 40 when the shelf 46 contacts the projection 62 of the insert 60. The projection 62 has a curved surface 66 that defines a bottom perimeteral fillet of the recess 44. The insert 60 can change the shape of the recess 44 and/or the number of the recesses 44 defined in the forming die box 40 (i.e. an insert 60 can fill the entire recess 44 such that the number of product cavities 7 formed by the forming die box 40 is reduced (e.g. a forming die box 40 with six recesses 44 receives two inserts 60 that completely fill two recesses 44 such that the number of product cavities 7 formed by the forming die box 40 is reduced to four)). Further, a variable depth mechanism 90 (described herein) is capable of moving the insert(s) 60 such that the number of product cavities 7 formed by the forming die box 40 is reduced.

The forming station 10 includes the variable depth mechanism 90 that moves the insert 60 to thereby vary the depth of the recess 44. The variable depth mechanism 90 includes at least one engagement member 92 that is slideably received in the hole 24 of the die box base 20. The engagement member 92 comprises a first end 93 that extends into the interior vacuum space 28 defined by the forming die box 40 and the die box base 20 and a second end 94 opposite the first end 93. The engagement member 92 contacts the insert 60 to thereby move the insert 60 and vary the depth of the recess 44. In certain examples, the first end 93 of the engagement member 92 comprises a plate 96 configured to contact the insert 60 and/or multiple inserts 60 received in the recess(es) 44 of the forming die box 40. In operation, axial movement of the first end 93 of the engagement member 92 causes axial movement of the insert 60. In certain examples, the engagement member 92 must return to a rest position (see the plate 96 depicted in solid line on FIG. 7) before the forming die box 40 can be moved to the staging position (see FIG. 2) (i.e. the engagement member 92 and/or the plate in an engagement position (see the plate 96 depicted in dashed line on FIG. 7) prevents the forming die box 40 from moving from the first position (see FIGS. 3-4) to the staging position (see FIG. 2), and vise versa). The variable depth mechanism 90 can be adapted for use with any type (e.g. size, shape) of forming die box 40.

The variable depth mechanism 90 includes a drive shaft 98 that is rotatably coupled to the die box base 20 and a platform member 100 that is coupled to the drive shaft 98 and the second end 94 of the engagement member 92. In one example, the platform member 100 includes screw threads and the drive shaft 98 includes screw threads that mate and/or engage with the screw threads of the platform member 100. An actuator 104 selectably rotates the drive shaft 98 such that the platform member 100 axially moves along the drive shaft 98 to axially move the insert 60 (e.g. when the drive shaft 98 is rotated by the actuator 104, the platform member 100 axially moves which causes the engagement member 92 to move). In the example depicted, the actuator 104 is a servo motor which selectively moves a belt 105 to thereby rotate the drive shaft 98. As the servo motor actuates in a first servomotor direction, the belt 105 moves in a first belt direction causing the drive shaft 98 to rotate in a counterclockwise direction; and when the drive shaft 98 actuates in a second servomotor direction, the belt 105 moves in a second belt direction causing the drive shaft 98 to rotate in a clockwise direction. In certain examples, the drive shaft 98 is rotatably supported by a fixed member assembly 108 that supports and allows rotation of the drive shaft 98. The fixed member assembly 108 being fixed with respect to the die box base 20.

Figure 9:
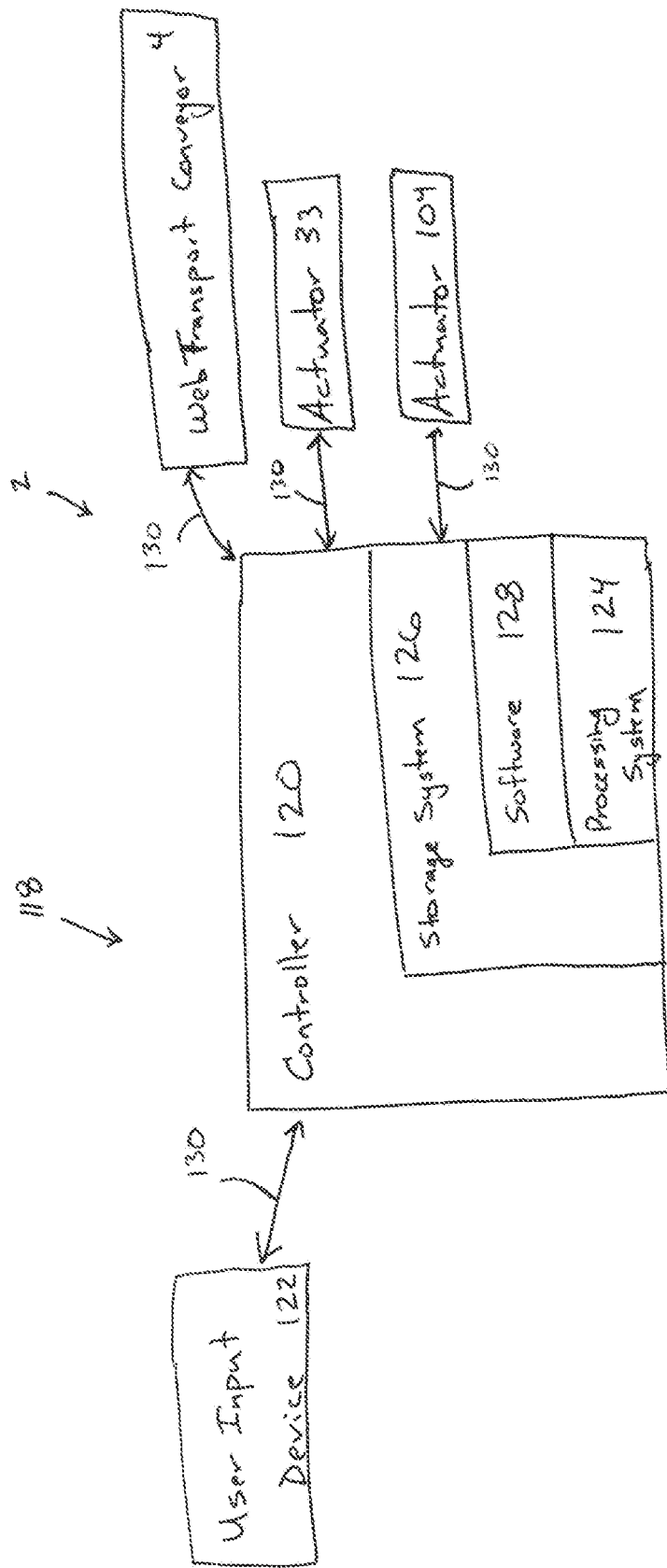
FIG. 9 is an example system of the packaging machine.

Referring to FIG. 9, the packaging machine 2 includes a controller 120 configured to control the components and devices of the packaging machine 2, including the components described herein. The controller 120 is configured to control movement of the web 6 via the web transport conveyor 4; actuation of the actuator 33 to move the lift arms 32 and the frame assembly 30, as described above; and/or the actuator 104 of the variable depth mechanism 90, as described above. The controller 120 is part of a system 118 included with the packaging machine 2. The system 118 includes a user input device 122 that allows the operator to input information into the system 118 to control the depth of the recess 44 in the forming die box 40. For example, the operator can input into the user input device 122 a selected recess depth of 3.0 inches such that the controller 120 sends appropriate signals (via wired or wireless communication links 130) to the actuator 104 of the variable depth mechanism 90. The actuator 104 then axially moves the engagement member 92 to axially move the insert 60 within the recess 44 such that the insert 60 defines the depth of the recess 44 at the selected recess depth.

The controller 120 includes a processing system 124, storage system 126, and software 128. The processing system 124 loads and executes software 128 from the storage system 126. When executed by the controller 120, the software 128 directs the processing system 124 to operate to carry out the methods described herein.

It should be understood that one or more software application modules could be provided within the software to carry out the same operation. Similarly, while description as provided herein refers to a controller 120 and a processing system 124, it is to be recognized that implementations of such systems can be performed using one or more processors, which may be communicatively connected, and such implementations are considered to be within the scope of the description.

The processing system 124 can comprise a microprocessor and other circuitry that retrieves and executes software 128 from storage system 126. Processing system 124 can be implemented within a single processing device but can also be distributed across multiple processing devices or sub-systems that cooperate in existing program instructions. Examples of processing system 124 include general purpose central processing units, applications specific processors, and logic devices, as well as any other type of processing device, combinations of processing devices, or variations thereof.

The storage system 126 can comprise any storage media readable by processing system 124, and capable of storing software 128. The storage system 126 can include volatile and non-volatile, removable and non-removable media implemented in any method or technology for storage of information, such as computer readable instructions, data structures, program modules, or other data. Storage system 126 can be implemented as a single storage device but may also be implemented across multiple storage devices or sub-systems. Storage system 126 can further include additional elements, such as a controller, capable of communicating with the processing system 124.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User input device 122 can include a mouse, a keyboard, a voice input device, a touch input device, a motion input device, and other comparable input devices and associated processing elements capable of receiving user input from a user. Output devices such as a video display or graphical display can display an interface further associated with embodiments of the system and methods as disclosed herein. Speakers, printers, bells and other types of output devices may also be included in the user input device 122. The user input device 122 may display the system 118 on a display screen, and/or may announce it via a speaker.

In certain examples, the forming station 10 includes a sleeve 101 that is coupled to the die box base 20 to support and seal the engagement member 92 with the die box base 20 as it slides in the hole 24 (see FIGS. 7-8). In certain examples, the vacuum cups 102 are coupled to the die box base 20 and configured to create the vacuum in the interior vacuum space 28 (see FIG. 7).

In certain examples, a packaging machine for forming a product cavity in a web includes a forming die box that defines a recess into which the product cavity is formed, an insert that is movable in the recess to thereby vary a depth of the recess, and a variable depth mechanism that moves the insert to vary the depth of the recess. The variable depth mechanism includes an engagement member that contacts the insert to thereby move the insert and vary the depth of the recess. A die box base supports the forming die box and defines an interior vacuum space therebetween, and the die box base further defines a hole that slidably receives the engagement member. The engagement member comprises a first end that extends into the interior vacuum space to thereby move the insert and vary the depth of the recess. The engagement member includes a second end opposite the first end. The variable depth mechanism can include a drive shaft, a platform member coupled to the drive shaft and the second end of the engagement member, and an actuator that selectively rotates the drive shaft such that the platform member moves along the drive shaft and the engagement member moves the insert. The variable depth mechanism includes a fixed member assembly that supports and allows rotation of the drive shaft. The fixed member assembly is fixed with respect to the die box base. In certain examples, the actuator is a servo motor. In certain examples, a computer controller controls the servo motor to thereby rotate the drive shaft.

In certain examples, a latching mechanism that moves the forming die box into and between a first position in which the forming die box is spaced apart from the die box base and a second position in which the die box base supports the forming die box. When in the first position, the forming die box is freely laterally movable away from the die box base, and when in the second position the forming die box is supported by the die box base. The forming die box has a perimeteral surface, and the die box base has a perimeteral surface that corresponds to and abuts the perimeteral surface of the forming die box in the second position. The latching mechanism has a rail member that supports the forming die box and an eccentric member such that rotation of the eccentric member moves the rail member thereby moving the forming die box into and between the first position and the second position. In certain examples, the latching mechanism has a handle configured to rotate the eccentric member. The forming die box includes a shelf that projects into the recess to support the insert in the forming die box, and the insert has a projection that radially extends from the insert and is supported by the shelf. The insert has an upper end and a lower end opposite the upper end such that the projection is positioned nearer the upper end than the lower end such that the lower end is axially below the shelf of the forming die box when the projection is supported by the shelf. In certain examples, the projection has a curved surface that defines a bottom fillet of the recess.

In certain examples, a packaging machine for forming a product cavity in a web includes a forming die box that defines a recess into which the product cavity is formed, a die box base that supports the forming die box, and a latching mechanism that moves the forming die box into and between a first position in which the forming die box is spaced apart from the die box base and a second position in which the forming die box is supported by the die box base. The latching mechanism further comprises an eccentric member such that rotation of the eccentric member moves the forming die box into and between the first position and the second position. The latching mechanism includes a rail member for supporting the forming die box, wherein the rail member axially moves when the eccentric member rotates.

In certain examples, a method for forming a product cavity in a web includes providing a forming die box that defines a recess into which the product cavity is formed, positioning an insert in the forming die box such that the insert is axially movable in the recess to thereby vary a depth of the recess, actuating a variable depth mechanism to move the insert to vary the depth of the recess, and forming the product cavity in the web. The method can include rotating a drive shaft that moves a platform member of the variable depth mechanism such that the engagement member moves.

In the present description, certain terms have been used for brevity, clearness and understanding. No unnecessary imitations are to be implied therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives and modifications are possible within the scope of the appended claims.

What is claimed is:

1. A packaging machine for forming a product cavity in a web, the packaging machine comprising:
   a die box base having a first perimeteral surface;
   a forming die box defining a recess into which the product cavity is formed, the forming die box having a second perimeteral surface;
   a latching mechanism that moves the forming die box relative to the die box base into and between:
      a first position in which the forming die box is spaced apart from and vertically directly above the die box base, the latching mechanism supports the forming die box, and the first perimeteral surface aligns with the second perimeteral surface; and
      a second position in which the die box base supports the forming die box and the first perimeteral surface abuts the second perimeteral surface;
   an insert movable in the recess of the forming die box and configured to vary a depth of the recess; and
   a variable depth mechanism configured to selectively move the insert to vary the depth of the recess.

2. The packaging machine according to claim 1, wherein the variable depth mechanism has an engagement member that contacts the insert to thereby move the insert and vary the depth of the recess.

3. The packaging machine according to claim 2, wherein the die box base and the forming die box define an interior vacuum space, and wherein the die box base further defines a hole through which the engagement member extends; and
   wherein the engagement member comprises a first end disposed in the interior vacuum space and configured move the insert to vary the depth of the recess.

4. The packaging machine according to claim 3, wherein the engagement member further comprises a second end opposite the first end, and wherein the variable depth mechanism further comprises:
   a drive shaft with a first end and an opposite second end;
   a platform member coupled to the drive shaft and the second end of the engagement member; and
   an actuator that selectively rotates the drive shaft such that the platform member moves relative to the drive shaft between the first end of the drive shaft and the second end of the drive shaft and the engagement member moves the insert.

5. The packaging machine according to claim 4, wherein the variable depth mechanism further comprises a fixed member assembly that supports and allows rotation of the drive shaft, and wherein the fixed member assembly is fixed with respect to the die box base.

6. The packaging machine according to claim 4, wherein the actuator is a servomotor, and further comprising a computer controller that controls the servo motor to thereby rotate the drive shaft.

7. The packaging machine according to claim 1 wherein the latching mechanism has a rail member that supports the forming die box when the forming die box is in the first position and an eccentric member, and wherein rotation of the eccentric member moves the rail member which thereby moves the forming die box into and between the first position and the second position.

8. The packaging machine according to claim 7, wherein the latching mechanism further comprises a handle configured to rotate the eccentric member.

9. The packaging machine according to claim 1, wherein the forming die box comprises a shelf that projects into the recess and supports the insert in the forming die box.

10. The packaging machine according to claim 9, wherein the insert comprises a projection that radially extends from the insert and is supported by on the shelf.

11. The packaging machine according to claim 10, wherein the insert further comprises an upper end and a lower end opposite the upper end; and
    wherein the projection is positioned nearer the upper end than the lower end such that the lower end is below the shelf of the forming die box when the projection is supported on the shelf.

12. The packaging machine according to claim 10, wherein the projection has a curved surface that is configured to define a bottom fillet of the recess.

13. The packaging machine according to claim 1, wherein the latching mechanism is adjacent to a side of the die box base.

14. A packaging machine for forming a product cavity in a web, the packaging machine comprising:
    a die box base having a first perimeteral surface;
    a forming die box defining a recess into which the product cavity is formed, the forming die box having a second perimeteral surface;
    a latching mechanism that moves the forming die box relative to the die box base into and between:
       a first position in which the forming die box is spaced apart from the die box base, the latching mechanism supports the forming die box, and the first perimeteral surface aligns with the second perimeteral surface; and
       a second position in which the die box base supports the forming die box and the first perimeteral surface abuts the second perimeteral surface;
    an insert movable in the recess of the forming die box and configured to vary a depth of the recess; and
    a variable depth mechanism configured to selectively move the insert to vary the depth of the recess;
    wherein the first perimeteral surface corresponds to the second perimeteral surface, and wherein when the forming die box is in the second position a fluid tight seal is formed between the first perimeteral surface and the second perimeteral surface.

15. The packaging machine according claim 14, further comprising a gasket along the first perimeteral surface, and wherein when the forming die box is in the second position the gasket is compressed between the first perimeteral surface and the second perimeteral surface.

* * * * *